United States Patent
Shah et al.

(10) Patent No.: US 6,486,436 B1
(45) Date of Patent: Nov. 26, 2002

(54) WORKPIECE CLAMPING SYSTEM

(75) Inventors: Kaval Shah, Derby (GB); Paul S Williams, Derby (GB); Stephen Corners, Derby (GB); Alvaro Herrero, Derby (GB); Janos AF Szeki, Derby (GB)

(73) Assignee: Rolls-Royce plc, London (GB)

( * ) Notice: Subject to any disclaimer, the term of this patent is extended or adjusted under 35 U.S.C. 154(b) by 87 days.

(21) Appl. No.: 09/707,884

(22) Filed: Nov. 8, 2000

(30) Foreign Application Priority Data

Nov. 13, 1999 (GB) .............................. 9926800

(51) Int. Cl.[7] .............................................. B21J 13/08
(52) U.S. Cl. .................... 219/121.82; 219/161
(58) Field of Search ................ 219/121.82, 121.67, 219/121.68, 121.64, 121.63, 121.69, 121.7, 121.71, 161–158

(56) References Cited

U.S. PATENT DOCUMENTS

| | | | |
|---|---|---|---|
| 1,449,369 A | * | 3/1923 | Anderson |
| 2,367,582 A | * | 1/1945 | Honyoust |
| 3,566,507 A | * | 3/1971 | Jacobsen |
| 3,827,020 A | | 7/1974 | Okamoto |
| 4,186,567 A | | 2/1980 | Monden |
| 5,772,192 A | * | 6/1998 | Hoffmann |
| 6,283,041 B1 | * | 9/2001 | Ono |

FOREIGN PATENT DOCUMENTS

| | | |
|---|---|---|
| GB | 2 118 885 A | 11/1983 |
| GB | 2 299 713 A | 10/1996 |

* cited by examiner

Primary Examiner—Tom Dunn
Assistant Examiner—Jonathan Johnson
(74) Attorney, Agent, or Firm—Warren Taltavull; Manelli Denison & Selter PLLC

(57) ABSTRACT

A magnetic clamping system and method for locating and holding a workpiece (6), in particular a non-magnetic workpiece (6) within a machine tool (2) and specifically a numerically laser cutting or drilling machine tool. The system comprising at least one magnet (9), and a fixture structure (7), attached to the machine tool, which cooperates and in use engages and supports a portion of the workpiece (6) mounted upon and within the fixture structure. At least one clamp member (11) made of a magnetic material is disposed opposite and facing the at least one magnet (9) with the magnet (9) so that the portion of the workpiece (6) is sandwiched between a clamp member (11) and the magnet (9). A magnetic attractive force between the clamp member (11) and magnet (9) providing a clamping force to hold the workpiece (6). The magnets (9) preferably permanent neodymium magnets. The fixture structure (7) comprises a plurality of interconnected sheet metal frame elements (21) and support members (23a,b)

12 Claims, 4 Drawing Sheets

WORKPIECE CLAMPING SYSTEM

FIELD OF THE INVENTION

The present invention relates generally to tooling systems for clamping and holding a workpiece within a machining system and in particular to workpiece tooling systems for clamping and holding a non-magnetic workpiece within a machine tool using magnetic means.

BACKGROUND OF THE INVENTION

Numerous machining systems exist for milling, drilling and cutting a workpiece. In such systems suitable tooling is used to hold the workpiece within the system in order for it to be machined. Conventionally the workpiece is held or clamped within the machining system by mechanical tooling means which grip and press against the workpiece to hold it in position. The tooling must secure the workpiece in place during the machining operation and must be able to prevent the workpiece from moving when subjected to the machining loads. The tooling should also not cause damage to the workpiece and must allow for easy access to the workpiece to allow for machining of the workpiece to occur. Furthermore the tooling should be arranged such that the workpiece can be rapidly installed and removed from the tooling and machining system in order to improve overall processing efficiency.

Laser machining systems for drilling, cutting, or machining present particular difficulties in the design of suitable tooling to hold the workpiece. In laser machining systems a laser beam is directed at the workpiece where it removes material from the workpiece to either drill a hole in the workpiece or, as the beam is traversed along a predetermined path, it cuts or machines the workpiece along that path to shape the workpiece. In such systems a clear line of sight for the laser beam to the portion of the workpiece to be machined, cut, or drilled is required. Conventional mechanical tooling and clamping arrangements for holding a workpiece within such a laser machining system are often not ideal since the tooling in order to provide the required clamping often encloses a portion of the workpiece and thereby obstructs portions of the workpiece. There is also a danger with laser machining that the beam will penetrate beyond the workpiece once the laser beam has machined or drilled a portion of the workpiece with the result that the laser beam may machine and damage a part of the tooling. Consequently the tooling has to be carefully designed and positioned relative to the areas of the workpiece to be machined. This complicates the design of the conventional tooling and makes any such tooling very specific to a particular workpiece with the result that there is little flexibility in the use of the tooling. This negates one of the advantages of laser machining systems which are extremely flexible in their application to producing different components. It is also often time consuming to set up such tooling and to install and remove the workpiece from the tooling. Although desirable to reduce such set up time in any operation, with laser machining since the actual machining process is relatively rapid reducing the set up time becomes even more important.

Magnetic clamping of a workpiece within a machining system has been proposed as an alternative tooling method and system. In such a magnetic clamping system a magnet, usually an electromagnet, is disposed on or within a worktable upon which the workpiece is placed within the machining system. The magnet then holds the workpiece in place using an attractive magnetic force that exists between the magnet and the workpiece. Such systems are effective in holding the workpiece in position, provide very little obstruction of the workpiece, are flexible and are also easy to set up to hold the workpiece. The use of such magnetic clamping systems is therefore desirable.

Unfortunately such conventional magnetic tooling and clamping systems are limited to holding metallic components and in particular workpieces of a magnetic material for example steel which are themselves attracted to the magnets. Workpieces of non-magnetic materials, for example plastics, aluminium or titanium, cannot be held with conventional magnetic tooling or clamping systems since a magnetic force between the workpiece and the magnet is not present to hold the component in place within the tooling and machining system. Electromagnets are also conventionally used in such systems generate a sufficient magnetic field to clamp the workpiece. The required control systems for the electromagnets add to the complexity of the resultant tooling system. The use of permanent magnets has been proposed however due to their lower magnetic strength, in particular when used to hold only weakly magnetic workpieces, the magnetic force generated by such permanent magnets is often not sufficient to adequately and securely hold the workpiece during the machining operation.

It is therefore desirable to provide a magnetic clamping system for holding a non-magnetic workpiece within a machining system which address the above mentioned problems and is simple, effective, easy to set up and which can be easily adapted to be used with a variety of different workpieces and/or which offers improvements generally.

SUMMARY OF THE INVENTION

According to a first aspect of the present invention there is provided a magnetic clamping system for locating and holding a workpiece within a machine tool, the system comprising at least one magnet, and a fixture structure, attached to the machine tool, which co-operates with and in use engages and supports a portion of the workpiece mounted upon and within the fixture structure; characterised in that, in use, at least one clamp member made of a magnetic material is disposed opposite and facing the at least one magnet with the magnet and clamp member on opposite faces of a portion of the workpiece so that the portion of the workpiece is sandwiched between a clamp member and a magnet, and a magnetic attractive force between the clamp member and magnet provides a clamping force to hold the workpiece upon and within the fixture.

The workpiece may be non-magnetic.

Preferably the magnet is mounted and fixed to the fixture structure. Alternatively the clamp member is part of the fixture structure.

The clamp member is preferably fabricated from mild steel. The at least one magnet is preferably a permanent magnet. In particular the at least one permanent magnet is a neodymium magnet. The clamp member may also be a magnet.

Preferably the fixture structure comprises a plurality of interconnected frame elements and support members, the frame elements joined to the support members. Furthermore the individual frame elements and support members are preferably substantially planar and are fabricated from sheet material. The frame elements and support members may be joined together by means of twist tabs which engage in a slot hole.

A magnetic clamping system described above maybe part of a laser machine tool. Preferably such a laser machine tool is a numerically controlled multi-axis laser cutting and drilling machine tool.

The workpiece may be of a substantially frusto conical shape and the fixture of an annular configuration with portions which correspond to the profile of a portion of the workpiece and which in use engage and bear against one part of a surface of the workpiece.

According to a second aspect of the present invention there is provided a magnetic clamping method for holding a non-magnetic workpiece within a machine tool using a clamping system comprising a separate magnet and a magnetic clamp member with either the magnet or clamp member attached to the machine tool, the method comprising sandwiching a portion of the workpiece between the said separate magnet and clamp member with a magnetic attractive force between the magnet and clamp member clamping the portion of the workpiece therebetween.

According to a yet further aspect of the present invention there is provided a laser machining system incorporating a magnetic clamping system as described above for holding a non-magnetic workpiece within the machining system.

DESCRIPTION OF THE DRAWINGS

The present invention will now be described by way of example only with reference to the following figures in which.

DETAILED DESCRIPTION OF THE INVENTION

Figure 1:
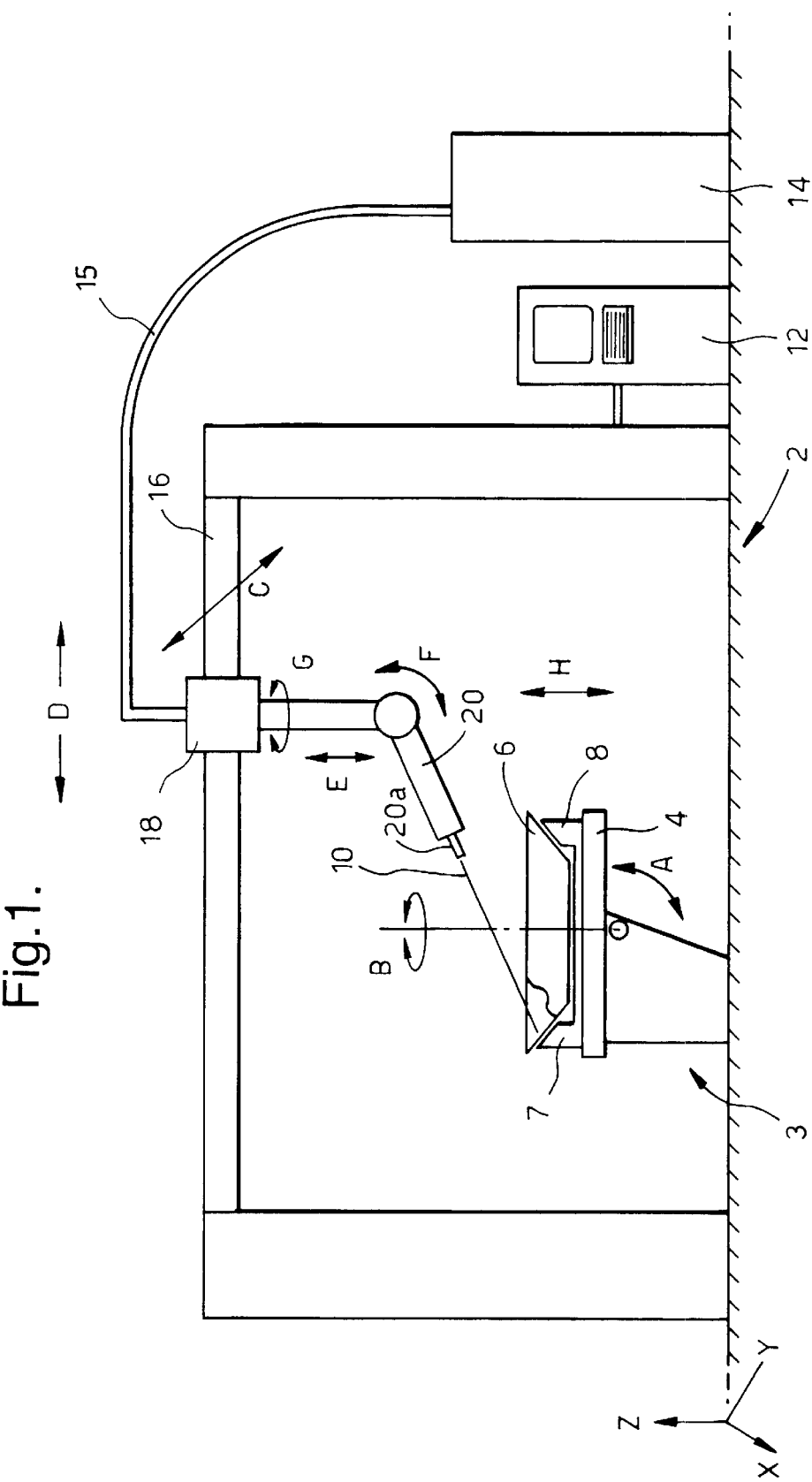
FIG. 1 shows a schematic representation of a laser machining system incorporating a magnetic clamping system according to the present invention.

A multi-axis laser machining system 2, or laser machine tool, is shown in FIG. 1. The system 2 comprises a robot arm 20 which is mounted upon a machine frame structure 16 and which can be moved and articulated in a number of directions indicated by arrows C to G by suitable actuators (not shown) under the control of a controller 12. A worktable assembly 3 incorporating a worktable 4 upon which the workpiece 6 or component to be machined by the laser machining system 2 is placed and mounted. The worktable 4 can be rotated and tilted as shown by arrows A, B and H to alter the position of the workpiece 6. The worktable assembly 3 is also under the control of the controller 12 such that the relative positions of the robot arm 20, worktable 4 and workpiece 6 are all controlled by the controller 12. A laser 14, for example a high powered $CO_2$ laser, is connected via a fibre optic cable 15, mirror path, waveguide or other suitable means to a laser head 20a mounted upon the distal end of the arm 20. In operation a laser beam 10 emanates from and is directed from the laser head 20a.

In operation the controller 12 articulates the robot arm 20, table 4 and workpiece 6 so that the laser head 20a is directed at the portion of the workpiece to be machined. The laser 14 is then operated under the control of the controller 12. The laser 14 is of a high power such that the laser beam is capable of melting the workpiece 6 material. The laser beam 10 strikes and machines the workpiece 6 producing a hole within the workpiece where the laser beam 10 is incident. In order to produce a cut the arm 20 and worktable 4 are articulated to translate the beam 10 across the workpiece 6 along the intended cut line. As such the laser machining system 2 and its operation is conventional and well known to those skilled in the art.

Figure 2:
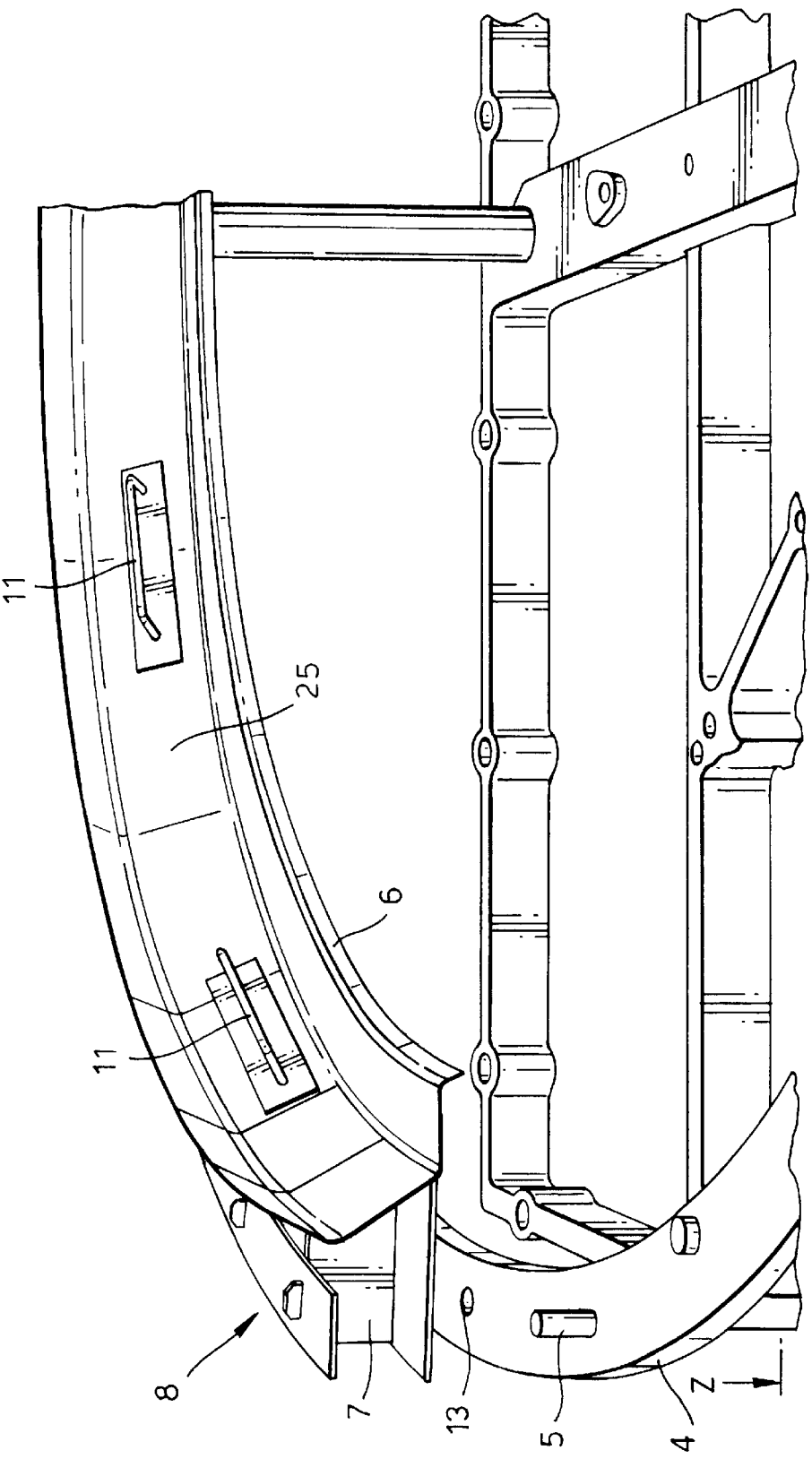
FIG. 2 is a more detailed part cutaway schematic illustration of part of the magnetic clamping system shown in FIG. 1.
Figure 3:
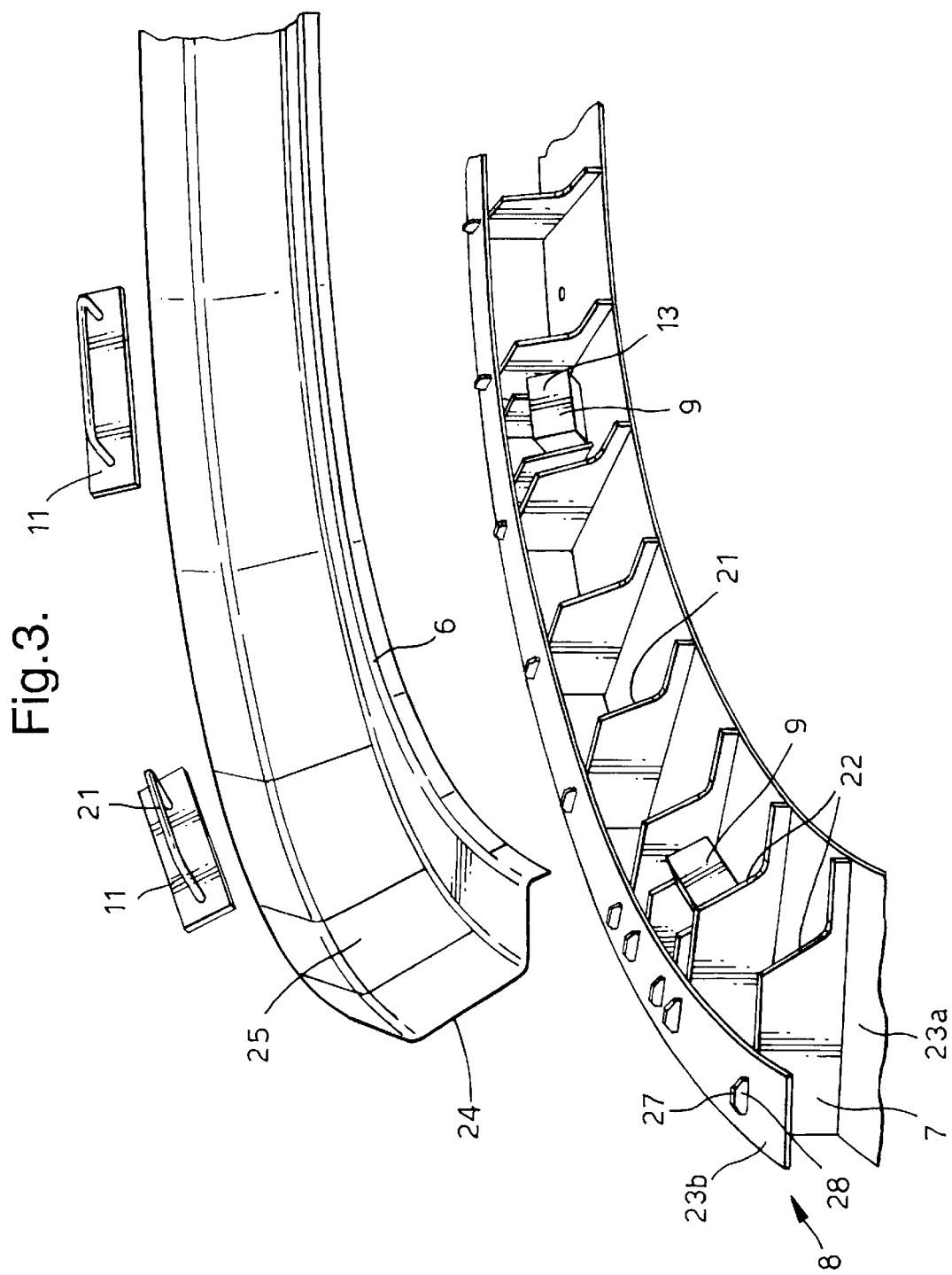
FIG. 3 is a schematic exploded illustration of part of the magnetic clamping system shown in FIG. 2.

The workpiece 6 is mounted and secured to the worktable 4. The mounting of the workpiece 6, mounting system and mounting tooling is shown in more detail in FIGS. 2 and 3. FIG. 2 shows the workpiece installed within the mounting tooling 8 whilst FIG. 3 shows an exploded view with the workpiece 6 and other parts of the mounting tooling 8 shown in a separated uninstalled positions.

In this particular embodiment the workpiece 6 comprises a generally frusto-conical structure of sheet metal, portions of which are to be machined and trimmed. As shown the mounting system 8 comprises a fixture structure 7 which is attached to the worktable 4 of the laser machine system 2. The fixture structure 7 is arranged to receive the workpiece 6 and supports the workpiece 6 which is placed upon the fixture structure 7. The fixture structure 7 comprises a series of planar frame elements 22 fabricated from sheet material. The frame elements 22 are interconnected and attached to support members 23a, 23b, in this case an annular base plate 23a and an annular top plate 23b, with the frame elements 22 extending between the two plates 23a, 23b. The frame elements 22 are arranged to be disposed around the installed workpiece 6 and the edges 21 of the frame elements 22 are profiled to correspond to the outer profile and surface 24 of the workpiece 6. When the workpiece 6 is installed within the fixture 7 portions of the fixture structure 7, in this case the profiled edges 21 of the frame elements 22 abut against the outer profile 24 of the workpiece 6 and support the workpiece 6 placed and installed within the fixture structure 7. In order to accommodate a range of similar workpieces 6 the edges 21 of the frames 22 may have a complex profile with different portions of the profile corresponding to the outer profile 24 of the different workpieces 6. In such a way for example a first workpiece engages and is supported by a first portion of the frame profile whilst a second, differently shaped workpiece, engages and is supported by a second portion of the edge profile 21.

The frame elements 22 and support members 23a, 23b which make up the fixture structure 7 may be joined together by welding, brazing or any other known method. The may even be bolted together. Preferably however the frame elements 22 and support members 23a, 23b are joined together using 'twist tab' connections. These are described in more detail in our pending International Patent Application number PCT/GB99/02128 which is incorporated herein by reference. As shown a tab 27 projection extends from the frame element 22 through a location slot hole 28 within the annular support plate 23a, 23b. The tab 27 and slot 28 thereby locating the frame 22 and support members 23a, 23b. The end of the tab 27 projection is twisted through 90° so that the end of the tab 27 is perpendicular to the slot hole 28. The tab 27 is thereby prevented from being removed from the slot 28 and the tab 27 thereby rigidly and securely clamps and locates the frame 22 and support members 23a, 23b together.

Location features 5 and attachment points 13 are provided to locate the fixture structure 7 to the worktable 4. In this embodiment a series of locating holes (not shown) are provided in the base plate 23a of the fixture structure 7. The worktable 4 has a number of locating dowels 5 which engage in the locating holes and locate the fixture structure 7 on the worktable 4. Bolts engaging in bolt holes 13 within the worktable 4 or other similar attachment means are also provided to securely attach the fixture structure 7 to the worktable 4. The location means 5 and attachment of the fixture structure 7 to the worktable 4 are preferably standardised so that different fixture structures 7 for different workpieces 6 can be fitted using the same locating features 5 and attachment points 13.

To make handling easier, the fixture structure 7 for a workpiece may comprise a number of sections which are individually located on the worktable 4 to define a complete fixture structure 7 for the workpiece 6. For example an annular fixture structure 7 suitable for holding the frusto-conical workpiece 6, shown, may comprise four individual quadrant sections which are individually attached to the worktable 4 to form a complete annular fixture structure 7.

The fixture structure 7 shown in FIGS. 2 and 3 is suitable for supporting the frusto conical workpiece 6 shown. Such a workpiece 6 is typical of a part of a combustor of a gas turbine engine which is generally fabricated from sheet material and is often machined and drilled using a laser machine tool system 2. It will be appreciated however that alternative fixture structures 7 can be fabricated in a similar way from suitably shaped frame 22 and support elements 23a, 23b to define a suitable fixture structure 7 for receiving and supporting workpieces 6 of different shapes.

The fixture structure 7 shown and described is relatively lightweight whilst by virtue of the interlocking frame elements 22 and support members 23a, 23b it is sufficiently strong and robust to adequately support the workpiece 6. The fixture structure 7 is also relatively simple and since it is fabricated from a number of generally planar elements which can easily be cut from sheet material it is also relatively simple and cheap to produce. Furthermore by virtue of its frame construction, the fixture structure 7 is relatively open allowing clear machining access to the workpiece 6 with very little obstruction of the workpiece 6 by the fixture structure 7. A further advantage of the open structure of the proposed fixture structure 7 is that it allows and accommodates improved ventilation of the workpiece 6 during machining. Such ventilation generally consists of air ducts which remove the molten material and waste products produced by the laser cutting or drilling and also may cool the workpiece 6 which is heated by the laser machining.

A series of permanent magnets 9, for example small neodymium magnets, are mounted and disposed within the fixture structure 7. The magnets 9 are arranged within the fixture structure 7 such that they are directed towards and face the workpiece 6 when it is installed within the fixture structure 7. The face 13 of the magnets 9 is also arranged to be in close proximity to the outer surface 24 of the workpiece 6 installed within the fixture structure 7. When the workpiece 6 is installed within the fixture structure 7 separate clamping shoes 11 are placed on the inside surface of the workpiece 6 at positions opposite and facing the magnets 9 mounted in the fixture structure 7. The clamping shoes 11 may profiled to conform to the inner surface 25 and profile of the workpiece 6 such that they abut against the inner surface 25 of the workpiece. The clamping shoes 11 are fabricated from a magnetic material for example mild steel and are magnetically attracted towards the magnets 9 located on the fixture structure 7. The clamping shoes 11 are pulled, by the magnetic force between the magnet 9 and shoe 11, towards the magnet 9 and so against the workpiece 6. The workpiece 6 is thereby sandwiched between the clamping shoe 11 and fixture 7 magnet 9 which secures the workpiece 6 against and to the fixture 7, as shown more clearly in FIG. 4. The clamping shoe 11 which is attracted to the magnet 9 clamps the workpiece 6 to the fixture 7 and worktable 4 by virtue of the magnetic attractive force between the magnets 9 and the clamping shoe 11. To aide fitting of the clamping shoes 11, and removal following machining, the clamping shoes 11 are provided with a handle 21 so that they can be pulled away from the workpiece 6 so releasing it from the fixture structure 7.

It will be appreciated that the use of the term magnetic material used throughout this description and used to describe the material of the clamping shoe 11 refers to a material (for example iron or steel) which is attracted by a magnet of magnetic field and is not strictly limited to a material which in itself is naturally a magnet and generates a magnetic field. The term non-magnetic should also similarly be interpreted as a material which is not attracted by a magnet or magnetic field (for example Aluminium).

The magnetic clamping system described above is relatively small and simple as compared to other conventional clamping systems and is not as bulky as such conventional systems. With this clamping system only a small part (considerably less than with conventional claming systems) of the workpiece 6 is obstructed by the clamping system. The clamping structure is also lightweight which reduces unnecessary loads on the workpiece 6 which may cause damage or distortion to the workpiece. Lower loads also allow a lightweight fixture structure 7 and worktable 4 to be used which are generally cheaper and easier to handle. Actuation loads on the worktable 4 are also accordingly reduced if a lightweight structure is used which also reduces cost of the machine tool and improves its performance. Furthermore since the clamping shoes 11 which hold the workpiece 6 within the fixture structure 7 do not have to be physically connected to the fixture structure 7 in order to provide the required clamping, machining access to the workpiece 6 is improved. The lack of such physical connections between the clamping shoes 11 and fixture structure 7 also makes installation and removal of the workpiece 6 from the fixture structure 7 relatively simple and so rapid which improves overall processing time.

The magnetic clamping of the workpiece 6 to the fixture structure 7 has the advantage over conventional magnetic clamping systems in that it can be used to secure and clamp workpieces 6 made from magnetic and non-magnetic materials. This is because it is the magnetic attraction of the clamping shoes 11 which provides a clamping force to secure the workpiece 6 rather than the existence of a magnetic force directly to the workpiece 6. It will be appreciated however that the magnetic clamping system described above using separate magnetic clamping shoes 11 can be used with magnetic workpieces 6. In such a case the workpiece 6 is secured to the fixture structure 7 by virtue of the magnetic force between the clamping shoes 11 and the magnets 9 in the fixture structure 7 as well as a magnetic force that will exist directly to the magnetic workpiece 7.

It will be appreciated by those skilled in the art that in alternative embodiments of the invention the positions of the clamping shoes 11 and magnets 9 could be reversed with clamping shoes 11 or in such a case clamping pads being mounted upon the fixture structure 7 and magnets 9 disposed on the inside of the workpiece 6 opposite the pads. In a yet further embodiment the clamping shoes 11 could in themselves be magnets or comprise in part a magnet provided that the careful note is taken of the magnetic poles of the magnets on the fixture structure 7 and clamping magnets so that an attractive rather than repulsive magnetic force is generated therebetween.

Figure 4:
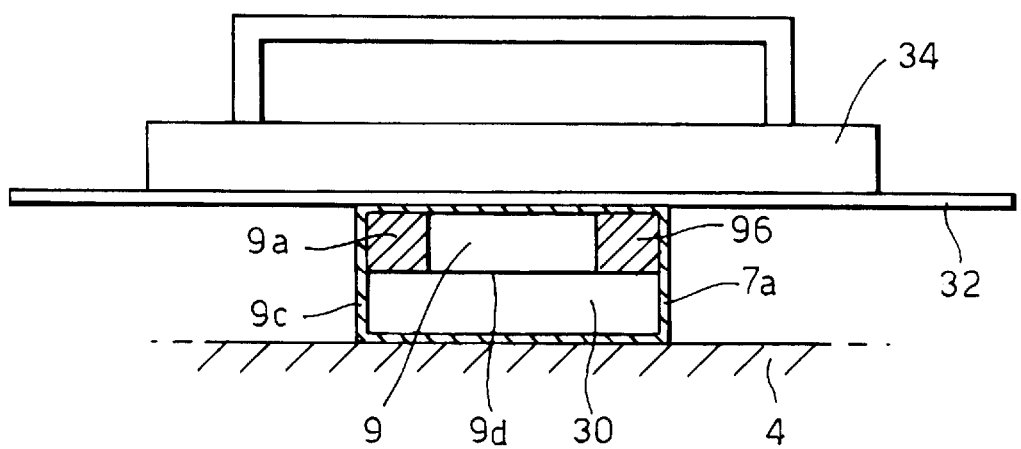
FIG. 4 is a schematic illustration showing the principle of the magnetic clamping system according to the present invention shown in FIGS. 2 and 3.

The magnets 9 typically comprise a magnet assembly comprising two small permanent magnet pieces 9a, 9b (for example 10 mm×10 mm×25 mm) mounted within a frame assembly 9d. Such a magnet assembly is shown more clearly in FIG. 4. The individual magnet pieces 9a, 9b being mounted side by side and separated by a slight distance to provide a two pole arrangement as shown in FIG. 4. The magnets and frame are then encased in a protective casing 9c, of a magnetically permeable material, in order to protect them. It is important to protect the magnet pieces since they tend to be very brittle and could quite easily be damaged in a production environment.

Since only small permanent magnets 9 are used the resultant magnetic forces between the clamping shoes 11 and magnets 9 and so the clamping forces securing the workpiece 6 within the fixture structure 7 are relatively low. A 50 mm by 30 mm by 30 mm 2 pole neodymium permanent magnet assembly, typical of those used within the fixture structure 7, provides for example an attractive force of approximately 50 N towards a mild steel plate mounted 2 mm away from it.

Furthermore the attractive force diminishes as the distance between the magnet 9 and clamping shoe 11 is increased making it important to locate the magnets 9 in the fixture structure 7 so that they are as close to the workpiece 6 and so clamping shoe 11 when installed. If however lower clamping forces are required, for example to reduce distortion of the workpiece 6 due to the clamping loads, then the magnets 9 could be mounted within the fixture structure 7 so that they are slightly further away from the workpiece 6 when it is fitted into the fixture structure 11.

In laser machining systems 2 the forces on the workpieces 6 during machining are relatively low or non-existent. Consequently the clamping forces required to secure the workpiece 6 are low and the clamping system is therefore particularly suited to securing workpieces 6 within such laser machining system 2.

Although the clamping system has been described for use with a complex shaped fixture structure 7 which is arranged to co-operate and conform to the shape of a complex workpiece 6 the magnetic clamping could be used with much simpler fixture structures 7a depending upon the shape and complexity of the workpiece 6. For example for planar sheet metal workpiece 32 the fixture structure 7a could comprise a simple support and attachment structure to attach the magnets 9 to the worktable 4 and hold them substantially flat as shown in FIG. 4. The flat planar sheet metal workpiece 32 would be placed on top of the magnets 9 and simple fixture support structure 7a with clamping shoes 34 placed on top of the sheet 32 over the magnets 9. As in the other embodiments the magnets 9 attach the clamping shoes 34 towards the magnets 9 sandwiching the sheet metal workpiece 32 therebetween and clamping the workpiece 32 in position on the worktable 4.

We claim:

1. A magnetic clamping system for locating and holding a workpiece within a machine tool, the system comprising at least one magnet, and a fixture structure, attached to the machine tool, which co-operates with and in use engages and supports a portion of the workpiece mounted upon and within the fixture structure, at least one clamp member made of a magnetic material which is, in use, disposed opposite and facing the at least one magnet with the magnet and clamp member on opposite faces of a portion of the workpiece so that the portion of the workpiece is sandwiched between a clamp member and the magnet, and with a magnetic attractive force between the clamp member and magnet providing a clamping force to hold the workpiece upon and within the fixture, said clamp member being a magnet and said fixture structure comprising a plurality of interconnected frame elements and support members, the frame elements being joined to the support members by means of twist tabs which engage in a slot hole.

2. A magnetic clamping system as claimed in claim 1 in which the workpiece is non-magnetic.

3. A magnetic clamping system as claimed in claim 1 in which the magnet is mounted and fixed to the fixture structure.

4. A magnetic clamping system as claimed in claim 1 in which the clamp member is part of the fixture structure.

5. A magnetic clamping system as claimed in claim 1 in which the clamp member is fabricated from mild steel.

6. A magnetic clamping system as claimed in claim 1 in which the at least one magnet is a permanent magnet.

7. A magnetic clamping system as claimed in claim 6 in which the at least one permanent magnet is a neodymium magnet.

8. A magnetic clamping system as claimed in claim 1 in which the individual frame elements and support members are substantially planar and are fabricated from sheet material.

9. A magnetic clamping system as claimed in claim 1 in which the machine tool is a laser machine tool.

10. A magnetic clamping system as claimed in claim 9 in which the laser machine tool is a numerically controlled multi-axis laser cutting and drilling machine tool.

11. A magnetic clamping system for locating and holding a workpiece within a machine tool, the system comprising at least one magnet, and a fixture structure, attached to the machine tool, which co-operates with and in use engages and supports a portion of the workpiece mounted upon and within the fixture structure, at least one clamp member made of a magnetic material which is, in use, disposed opposite and facing the at least one magnet with the magnet and clamp member on opposite faces of a portion of the workpiece so that the portion of the workpiece is sandwiched between a clamp member and the magnet, and with a magnetic attractive force between the clamp member and magnet providing a clamping force to hold the workpiece upon and within the fixture, said workpiece being of a substantially frusto-conical shape and the fixture being of an annular configuration with portions which correspond to the profile of a portion of the workpiece and which in use engage and bear against one part of a surface of the workpiece.

12. A laser machining system incorporating a magnetic clamping system as claimed in claim 1 for holding a non-magnetic workpiece within the machining system.

* * * * *